United States Patent [19]
Yamamoto et al.

[11] Patent Number: 4,840,402
[45] Date of Patent: Jun. 20, 1989

[54] AUTOMATIC LOCKING AND RELEASING ARRANGEMENT FOR VEHICULAR SEAT BELT

[75] Inventors: Kazuo Yamamoto, Sagamihara; Katsuyasu Ono, Yokohama; Shinichi Yamamuro, Toyoake, all of Japan

[73] Assignees: Nippon Seiko Kabushiki Kaisha; Chuo Hatsujo Kabushiki Kaisha, both of Tokyo, Japan

[21] Appl. No.: 201,436

[22] Filed: Jun. 2, 1988

[30] Foreign Application Priority Data

Jan. 29, 1988 [JP]  Japan ................... 63-17337

[51] Int. Cl.⁴ ........................................... B60R 22/06
[52] U.S. Cl. .................................... 280/804; 297/483
[58] Field of Search ............... 280/804, 801, 802, 803; 297/475, 478, 477, 483

[56] References Cited

U.S. PATENT DOCUMENTS

| | | |
|---|---|---|
| 4,580,813 | 1/1986 | Hashimoto ................. 280/804 |
| 4,647,070 | 3/1987 | Yamamoto ................. 280/804 |
| 4,671,537 | 6/1987 | Yoshitsugu ................. 280/804 |
| 4,703,949 | 11/1987 | Fohl ......................... 280/804 |
| 4,733,886 | 3/1988 | Yokote ...................... 280/804 |

FOREIGN PATENT DOCUMENTS 62-175241 7/1987 Japan .
62-122756 8/1987 Japan .

Primary Examiner—Richard A. Bertsch
Attorney, Agent, or Firm—Blum Kaplan

[57] ABSTRACT

An automatic locking and releasing arrangement for vehicular seat belt including a guide rail provided with first and second guide passages, a driving cable adapted to slide through the first guide passage, a connector and a cam both fixed to the cable at a predetermined spacing from each other, a slider adapted to slide through the second guide passage and engage the connector and the cam, a seat belt attached to the slider through a buckle, and an anchor device for retaining the slider in a locking seat belt position. A ring-like slide member is fixed to the cable portion positioned between the connector and the cam, the ring-like slide member comprising plurality of slide portions having a sectional shape a little smaller than that of the first guide passage and arranged through a flexible portion formed between adjacent slide portions. The cable is slid through the first guide passage of the guide rail by the slide portions of the ring-like slide member.

8 Claims, 7 Drawing Sheets

AUTOMATIC LOCKING AND RELEASING ARRANGEMENT FOR VEHICULAR SEAT BELT

BACKGROUND OF THE INVENTION

1. Field of the Invention:

The present invention relates to an automatic locking and releasing arrangement for vehicular seat belt whereby a seat belt is automatically locked when an occupant of an automobile or the like sits on a seat and the belt is automatically released when the occupant gets off the automobile.

2. Description of the Prior Art:

Various types of seat belts for protecting occupants of automobiles and the like have been proposed. Also available are various types of devices for effecting automatic lock and release of a seat belt.

For example, a so-called three-point type seat belt system is shown in FIG. 9, in which a belt retractor 4 is disposed at a side portion of a seat 3 and an end portion of one belt 1a out of two belts to be wound up by the retractor 4 is attached to a door 6 of a vehicle to constitute a shoulder belt, while an end portion of the other belt 1b is attached to a slider and a waist belt is constituted by sliding of the slider along a guide rail 7 mounted on the inner surface of the door 6.

Another type of a seat belt system is shown in FIG. 10, in which a guide rail 11 is attached to a side panel of a vehicle body along the opening portion of the door 6, and a slider 5 which supports an end portion of a shoulder belt 1a is allowed to slide through the interior of the guide rail 11 to facilitate lock and release of the shoulder belt. For driving said slider there is provided a cable having a member adapted to engage the slider, which cable is operated by means of a drive unit such as a motor, thereby affording a motor-driven seat belt system.

Such motor-driven type seat belt system requires an anchor device for fixing the slider of a buckle in a seat belt locked position automatically and positively and for releasing the slider automatically.

Kazuo Yamamoto has disclosed this type of art in U.S. Pat. No. 4,647,070 already granted a patent right in the U.S.

According to this art, a connector and a cam are attached to a cable in predetermined positions so that the slider of a buckle slides while being sandwiched by the connector and the cam, and an anchor latch provided in an anchor portion and a pawl of the slider are engaged with and disengaged from each other by operating the anchor latch with the cam. In this connection, the prior art in question is constructed so that the connector and the cam can travel a predetermined distance with respect to the slider, thereby bringing the anchor latch into engagement or disengagement with the cam automatically.

On the other hand, in the construction of the guide rail 11, a bent portion 11a having a small radius of curvature is present, so it is necessary to provide means for reducing the sliding resistance when the connector and the cam pass through said bent portion. Particularly, where the cable is not an endless type but a winding type, there is fear of the occurrence of buckling due to the sliding resistance at such bent portion during delivery of the cable, which would make the sliding motion impossible.

SUMMARY OF THE INVENTION

The present invention provides an automatic locking and releasing arrangement for vehicular seat belt wherein a connector and a cam both fixed on a cable slidably with respect to the slider of a buckle can pass through a bent portion of a guide rail smoothly at a reduced resistance.

According to a basic construction adopted by the present invention for solving the above-mentioned problem, there is provided a guide rail mounted along an opening portion of a vehicular door or on the inside surface of the door pivotably disposed within the said opening portion; a cable adapted to slide through a first guide passage formed in the guide rail; a drive unit for driving the cable; a connector and a cam both fixed to the cable at a predetermined spacing from each other; a slider fitted in a second guide passage formed in the guide rail in communication with the first guide passage, and adapted to engage the connector and the cam and slide through the second guide passage of the guide rail; a seat belt attached to the slider through a buckle; an anchor device for retaining the slider in a locking operative position of the seat belt; and a ring-like slide member fixed to the core of the cable portion positioned at least between the connector and the cam, the ring-like slide member comprising a plurality of slide portions arranged at slight intervals in the longitudinal direction of the cable through a flexible portion formed between adjacent slide portions, the section of each such slide portion in a plane perpendicular to the core of the cable being a little smaller than the section of the first guide passage, and the cable being slid through the first guide passage of the guide rail by the slide portions of the ring-like slide member.

BRIEF DESCRIPTION OF THE DRAWINGS

Various other objects, features and attendant advantages of the present invention will be more fully appreciated as same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
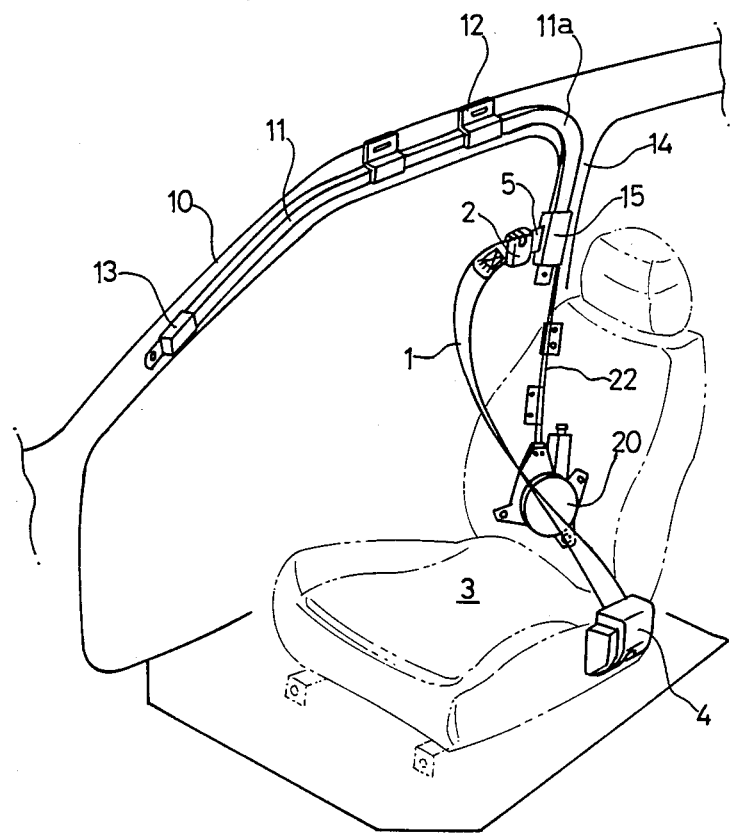
FIG. 1 is a perspective view of an automatic locking and releasing arrangement for a seat belt according to the present invention.
Figure 2:
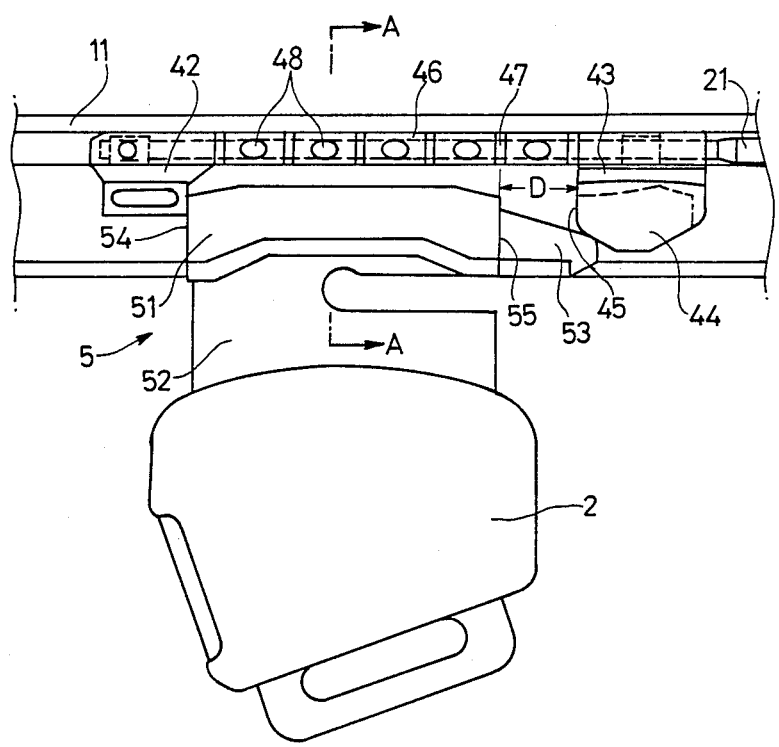
FIG. 2 is a view explanatory of the relation between a guide rail and a slider.
Figure 3:
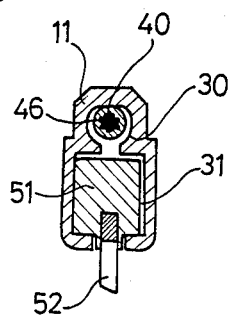
FIG. 3 is a cross-sectional view along Line A—A in FIG. 2.

Referring first to FIG. 1, there is illustrated an embodiment of the present invention applied to a motor-driven, two-point type seat belt system, in which a guide rail 11 is attached to a side frame 10 of a vehicle through brackets 12. To a front end portion 13 of the guide rail 11 is mounted a limit switch, while the opposite end portion of the guide rail 11 is bent downwards along a side pillar 14 of the vehicle and an anchor device 15 is mounted to the end.

At a lower part of the vehicle there is mounted a drive unit 20 for actuating a cable using a motor. The cable, indicated at 21, is wound up or wound off with respect to a drum which is driven by the motor of the drive unit 20, whereby a connector and a cam both fixed to the front end portion of the cable 21 at a predetermined interval are allowed to slide through the guide rail 11. The connector and the cam are adapted to engage a slider 5 which can be fixed to a buckle 2 attached to the front end of the seat belt 1, to bring the slider 5 into engagement with and disengagement from the anchor device 15 in a manner as will be described later. The other end portion of the seat belt 1 is wound up by a retractor 4 fixed to a seat 3. The cable 21 passes through a sheath pipe 22 which connects the drive unit 20 and the anchor device 15, and is conducted to the guide rail 11.

FIG. 2 to 5 illustrate a portion equipped with the slider as well as a connector and a cam both adapted to engage the slider, according to the first embodiment of the present invention. The guide rail 11, as shown in section in FIG. 3, has a first guide passage 30 of a generally circular shaped for guiding the cable 21 and a second guide passage 31 of a generally rectangular shape for guiding a wide portion 51 of the slider 5. The slider 5 is connected to the buckle 2 through a narrow plate portion 52. Further, the slider 5 is formed with an engaging pawl 53 at its end portion on the side facing to the anchor device 15.

On the other hand, the cable 21 comprises a wire 40 as a core obtained by first stranding several fine steel wires and then further stranding several strands thus formed, and a synthetic resin layer formed over the circumference of the core. To the front end portion of the cable 21 is mounted a connector 42 and also mounted is a cam 43 sandwichwise with respect to the slider 5. More specifically, the cam 43 has bifurcated leg portions 44 formed to sandwich a pawl 53 of a small width provided on the side of the slider 5. Therefore, when the cam 43 moves to the left in FIG. 2, it comes into engagement with the slider 5 after a side face 45 of the cam 43 travels the distance D until abutment with a side face 55 of the slider. When the connector 42 slides to the right together with the cable 21, an end portion of the connector 42 comes into abutment with a side face 54 of the slider 5 and drives the slider 5. In the portion of the cable 21 located between the connector 42 and the cam 43, the synthetic resin coating is removed and instead a ring-like slide member 46 is provided. The ring-like slide member 46 functions to guide the core of the cable 21 positioned between the connector 42 and the cam 43 in such a manner that the core passes approximately through the center of the first guide passage 30 of the guide rail 11 regardless of whether the guide rail 11 is bent or not. The ring-like slide member 46 is provided between the connector 42 and the cam 43. It comprises a plurality of slide portions having a sectional shape a little smaller than that of the first guide passage 30 which has a generally circular section in a plane perpendicular to the core 40 of the cable 21. By those slide portions, the flexibility of the cable 21 is maintained and the cable 21 is guided through the first guide passage 30 of the guide rail 11; further, the connector 42 or the cam 43 projecting into the second guide passage 31 in communication with the first guide passage 30 is kept engaged with the slider 5 even where the guide rail 11 is bent at a small radius, the core of the cable 21 is allowed to pass through the center of the first guide passage 30 at a small sliding resistance.

The ring-like slide member 46 used in the first embodiment comprises a plurality of keg-like rings of a small axial length arranged at slight intervals in the axial direction of the core 40 of the cable 21. The keg-like rings are formed of a plastic material such as a synthetic resin of a small sliding resistance and they are fixed to the core 40 of the cable 21. The maximum section of each keg-like ring in a plane perpendicular to the core 40 of the cable 21 is a little smaller than the section of the first guide passage 30 of the guide rail 11 so that the rings are allowed to slide at a small sliding resistance through the guide passage 30. The section at both axial ends of each ring is smaller than the said maximum section. In fixing the ring-like slide member 46 onto the core 40 of the cable 21, a predetermined spacing can be maintained between adjacent rings by fitting a thin-walled tubular ring on the core 40 in the position between adjacent keg-like rings. In the case where the whole of the ring-like slide member 46 is formed integrally with the core 40 by molding, it is desirable that the diameter of each connection 47 between adjacent keg-like rings be made small to enhance the flexibility of the entire molding. Window holes 48 may be formed in the thus-molding ring-like slide member 46 to improve bendability. The window holes 48 reach the surface of the wire 40 and their shape is suitably selected, e.g. circular or rectangular. It is desirable that they be provided in a direction orthogonal to the projecting direction of the connector 42 and the cam 43. Further, a spiral groove may be formed throughout the whole of this molded part.

In place of such synthetic resin rings, the ring-like slide member 46 may be constituted by caulking metallic rings onto the wire at predetermined intervals. Or metallic ring-like pieces may be attached onto the wire by die casting. In this case, both side faces of the ring-like slide member may be tapered so that adjacent rings can bend with respect to each other and slide easily.

The ring-like slide member as well as the connector and the cam used in this embodiment are constructed as above. Now, a correlative mechanism of the slider and an anchor latch portion will be explained below.

The anchor device 15 has a casing 61 and is fixed to the vehicle body by a flange 60 thereof. An anchor latch 62 is provided on the lower surface of the casing 61. The latch 62 is mounted to an arm of a spring 63 which is supported pivotably by a pivot shaft 64. It is normally urged upwards by the spring 63, but when a projecting portion 65 is pushed by the leg portions 44 of the cam 43, the entire anchor latch can move downwards. Further, a limit switch 66 is attached to an end portion of the casing 61 to restrict the moving end of the cable 21 and control the turning off of the motor of the drive unit 20.

The operation of this embodiment will be described below.

Figure 4:
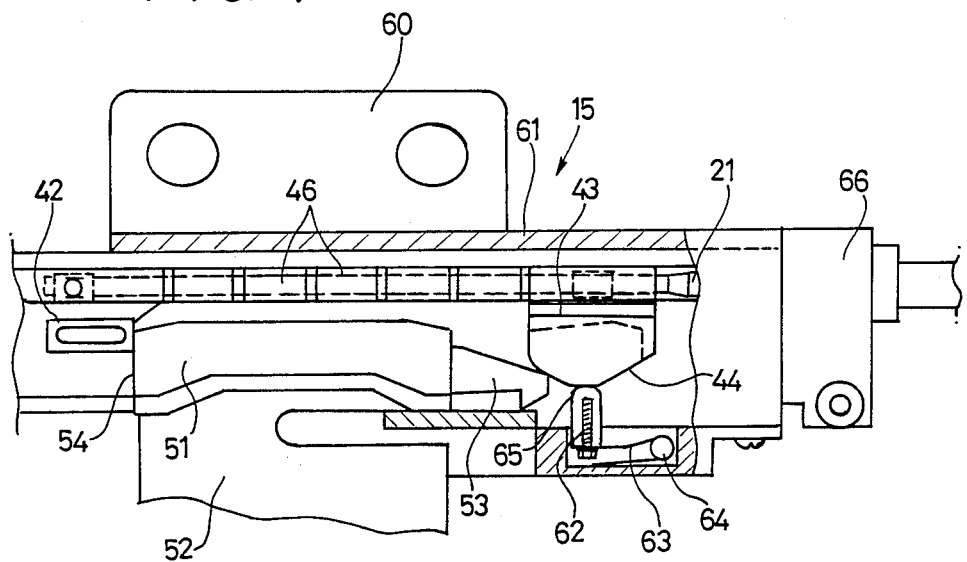
FIG. 4 is an explanatory view showing an example of an anchor device.
Figure 5:
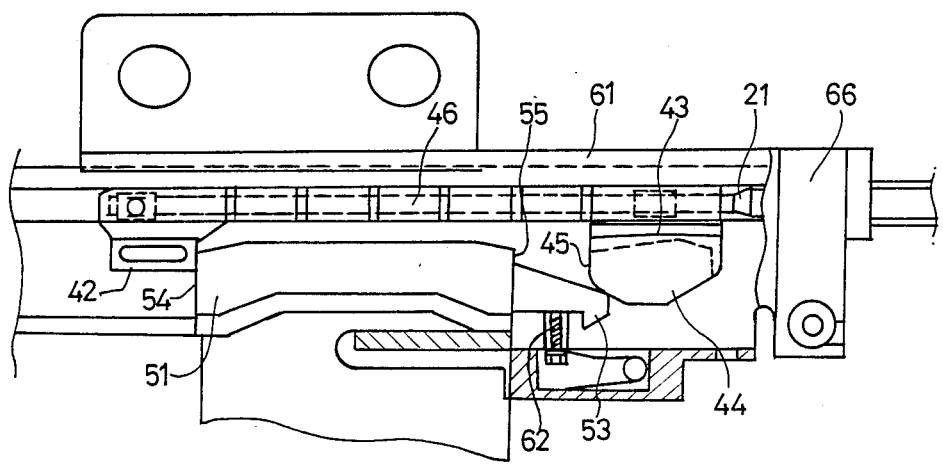
FIG. 5 is an explanatory view showing an engaged state of an anchor latch and a slider pawl.

When pulled by the cable 21 in FIG. 4, the connector 42 moves toward the anchor device 15 and pushes one side face 54 of the slider 5, so that the pawl 53 of the slider 5 approaches the anchor latch 62. As shown in the figure, the cam 43 moves ahead of the slider and depresses the anchor latch 62 through its leg portion 44, allowing the pawl 53 to pass over the latch 62. Thereafter, the anchor latch 62 reverts to its upper position by virtue of the spring 63 and comes into engagement with the pawl 53 as shown in FIG. 5 to latch the pawl. The limit switch 66 detects this state and turns off the motor of the drive unit 20 for the cable 21. The locking of the seat belt 1 is now over.

Now, the operation for disconnecting the slider from the anchor device will be explained below.

When the motor of the cable driving unit 20 is rotated in the reverse direction by a suitable switch means, the cable 21 is pushed out and the cam 43 moves away from the limit switch 66. As previously explained in connection with FIG. 2, there is the spacing D between he side face 45 of the cam 43 and the side face 55 of the slider 5, so the cam 43 travels through this spacing and depresses the projecting portion 65 of the anchor latch through its leg portions 44. In this state the cam 43 abuts the slider 5 and pushes it out, so the pawl 53 of the slider can pass over the anchor latch 62. The drive unit 20 continues to push out the cable 21 until the slider 5 abuts the limit switch 13 located at the front end portion of the rail 11, whereupon the motor is turned off. Now the release of the seat belt 1 is over.

It is necessary that the guide rail 11 be formed with a bent portion 11a of a small radius of curvature at an intermediate part thereof. But since the ring-like slide member 46 is provided over the wire 40 of the cable 21 positioned between the connector 42 and the cam 43, the connector 42 and the cam 43 can slide smoothly even through such bent portion.

Figure 6:
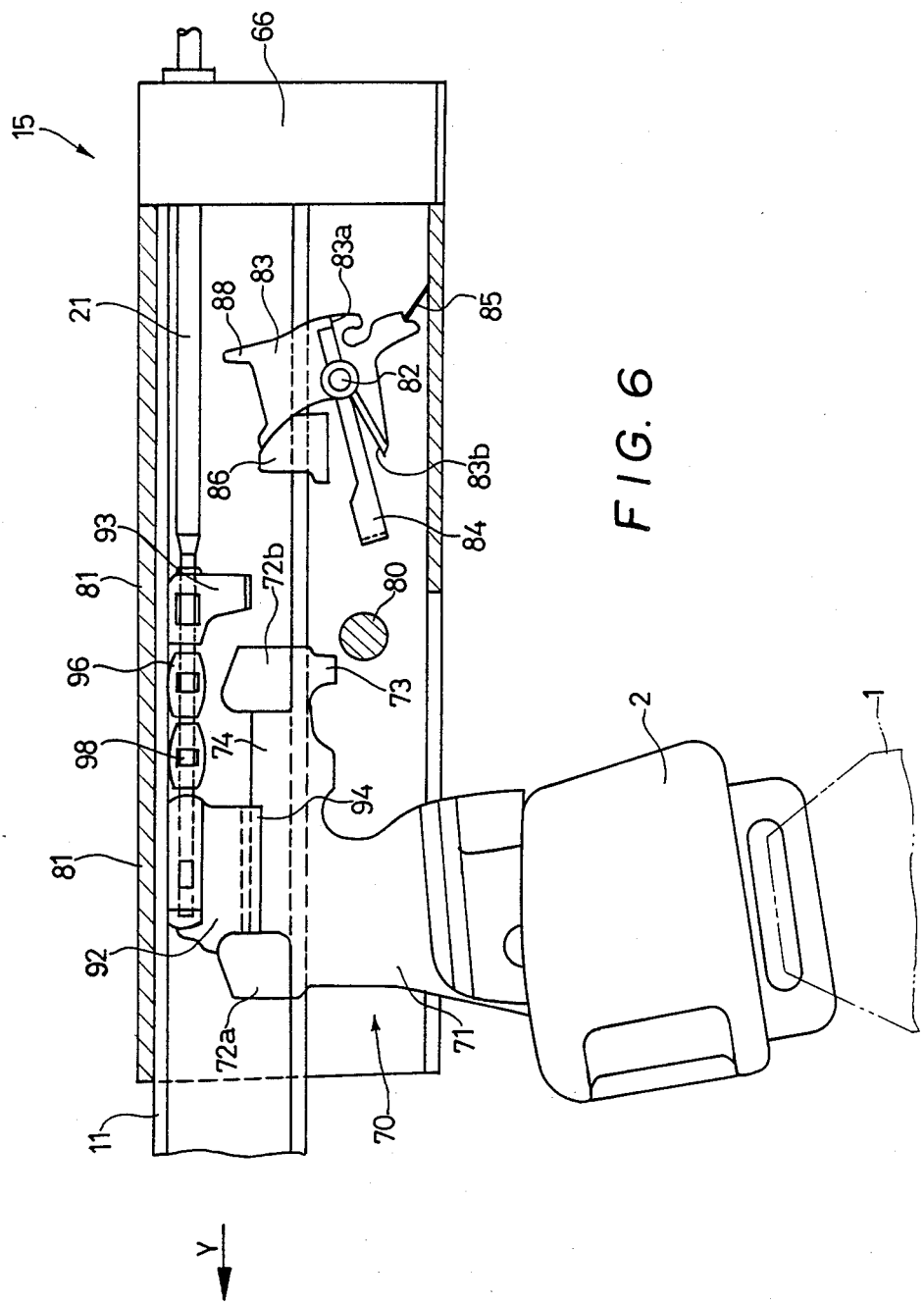
FIG. 6 is an explanatory view showing another example of an anchor device.
Figure 7:
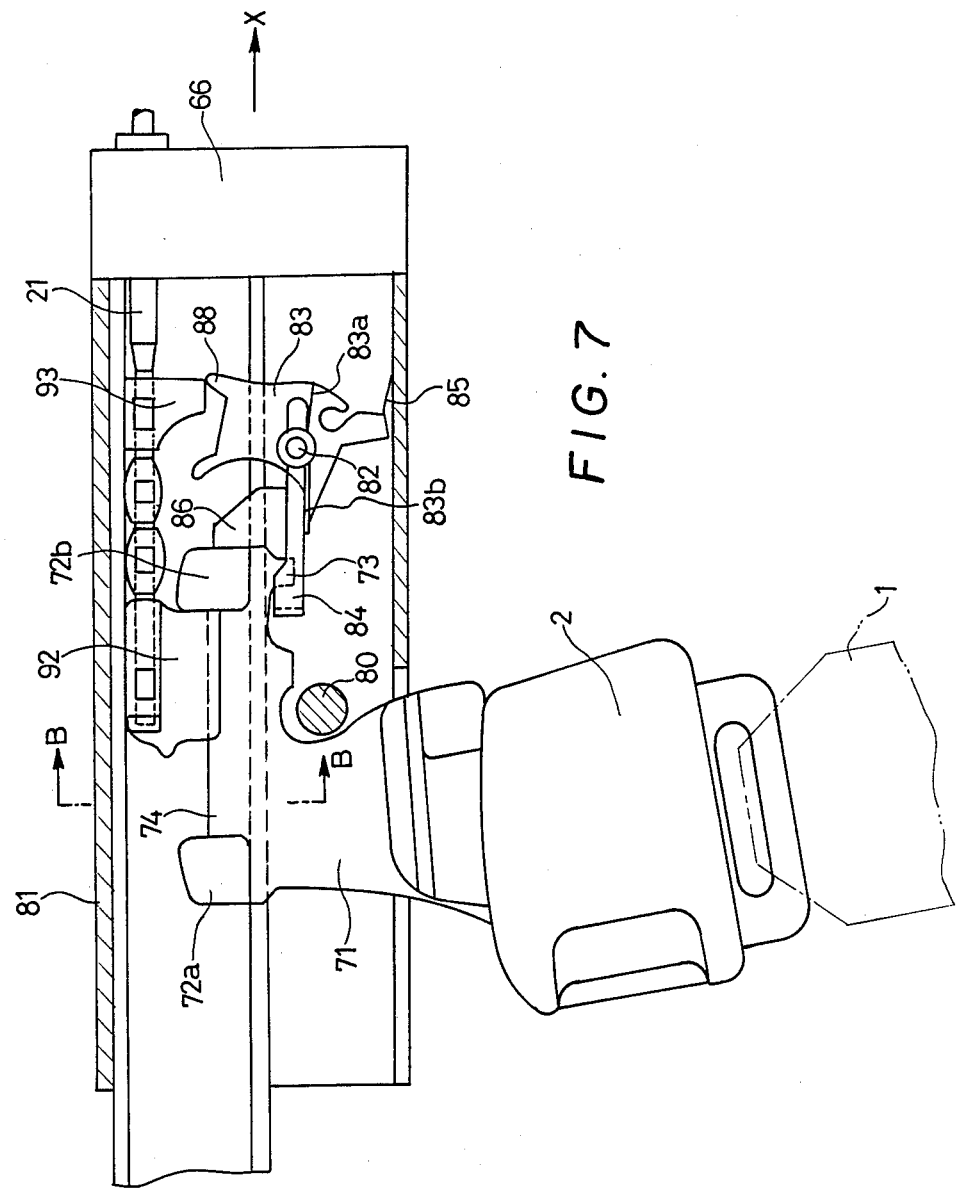
FIG. 7 is an explanatory view showing an engaged state of an anchor latch and a slider pawl.
Figure 8:
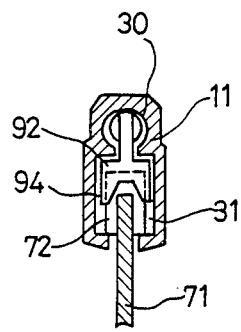
FIG. 8 is a cross-sectional view along Line B—B in FIG. 7.

The following description is now provided about another embodiment of the present invention with reference to FIGS. 6 to 8.

Also in this embodiment, like the previous embodiment, the cable 21 moves through the passage 30 of a generally circular section of the guide rail 11 which has such a sectional shape as shown in FIG. 8, and a slider 70 adapted to engage a connector 92 and a cam 93 both attached to the front end portion of the cable 21 slides through the passage 31 of a generally rectangular section. But this embodiment is different in the mechanism of an anchor device for retaining the slider.

The anchor device 15 has a casing 81 for insertion therein of the guide rail 11 and it is fixed to the vehicle body with a bolt 80. To the casing 81 is attached a cam follower 83 pivotably through a shaft 82, and an anchor latch 84 separate from the cam follower 83 is also mounted on the shaft 82. The anchor latch 84 is generally [-shaped in plan and is adapted to engage a pawl 73 of a thin plate portion 71 of the slider 70. The cam follower 83 is normally urged counterclockwise with respect to the shaft 82 by means of a spring 85 and is retained by a stopper 86.

The anchor latch 84 is urged clockwise in the figure with respect to the shaft 82 by the coil spring (not shown) wound round the shaft 82 and disposed between the latch 84 and the cam follower 83, and an end portion thereof opposite to its end portion for engagement with the pawl 73 with respect to the shaft 82 is retained by a stepped portion 83a formed on the side face of the cam follower 83. When the anchor latch 84 is in abutment with the stepped portion 83a under the biasing force of the coil spring (not shown) its portion on the side to be engaged with the pawl 73 is slightly spaced from a stepped portion 83b formed on the side face of the cam follower 83.

The slider 70 integral with the buckle 2 which engages the end portion of the seat belt 1 disengageably, has the thin plate portion 71 and a pair of thick plate portions 72a and 72b which are in engagement with the passage 31 of a generally rectangular section of the guide rail 11. Attached to the front end of the cable 21 is a connector 92 having bifurcated legs 94 which are engaged with an upper edge 74 of the thin plate portion 71 of the slider 70 so as to slide along the upper surface thereof. The slider 70 is slid by abutment of either the front or the rear end of the connector 92 with either the thick plate portion 72a or 72b of the slider 70. Spaced a predetermined distance from the connector 92 is a cam 93. Further a ring-like slide member 96 is fitted on the wire 40 of the cable 21 positioned between the connector and the cam. This ring-like slide member is formed in the same manner as previously noted, that is, by molding of a synthetic resin or by die casting of a metallic material. And it is formed with window holes 98 or the like, which are square in this embodiment.

In the state of FIG. 6, the cable 21 is pushed out in the direction of arrow Y which is a seat belt releasing direction, and the connector 92 abuts one thick plate portion 72a of the slider 70 to force out the latter toward the front end of the rail.

Next, in the state of FIG. 7, the cable 21 is wound up in the direction arrow X and the connector 92 slides along upper edge portion 74 of the slider into abutment with the opposite-side thick plate portion 72b to shift the slider 70 in the direction of arrow X. When the preceding cam 93 reaches the anchor device and presses a projection 88 of the cam follower 83, the cam follower 83 is pivoted clockwise against a spring 85. As a result, the anchor latch 84 is also allowed to pivot and comes into engagement with the pawl 73 of the slider 70 to lock the latter. In this case, the coil spring (not shown) ensures the engagement between the anchor latch 84 and the pawl 73. This condition is detected by the limit switch 66 to turn off the motor of the drive unit 20. The locking of the seat belt is now over.

A combination of the slider, connector, cam cable and ring-like slide member in the first embodiment with the anchor latch in the second embodiment (FIG. 6 to 8) is also considered inevitably.

Although in the above embodiments there is used a drum type as a cable driving and winding unit, there also may be adopted a construction in which a pulley is mounted at the front end portion of the guide rail, then a cable is entrained about the pulley in an endless fashion, a connector and a cam are attached to the cable in predetermined positions, and a ring-like slide member is disposed between the connector and the cam.

As set forth hereinabove, the present invention is an automatic locking and releasing arrangement for vehicular seat belt wherein there are formed in the guide rail a first passage for guiding the cable slidably and a second passage adjacent to the first passage and functioning to guide slidably the connector and cam fixed to the cable. This construction permits smooth sliding motion of the cable, connector and cam. Besides, on the cable portion positioned between the connector and the cam there are formed slide portions at slight intervals in the longitudinal direction of the cable, the section of each slide portion in a plane perpendicular to the core of the cable being a little smaller than the section of the above first passage. Consequently, the connector and the cam are slid smoothly, even in a bent portion of the guide rail.

Moreover, since the slide portions are interconnected through a flexible material to constitute a ring-like slide member, there is ensured smooth passage even in a bent portion of the guide rail. Further, the ring-like slide member can be given a desired degree of flexibility using a synthetic resin, a metallic material, or any other suitable material, so it is possible to make the most suitable design in consideration of sliding resistance. Further, the connector and the cam capable of sliding smoothly under the action of the ring-like slide member are adapted to engage the latch mechanism of the anchor device, thereby permitting positive connection and disconnection of the buckle with the seat belt attached thereto.

Figure 9:
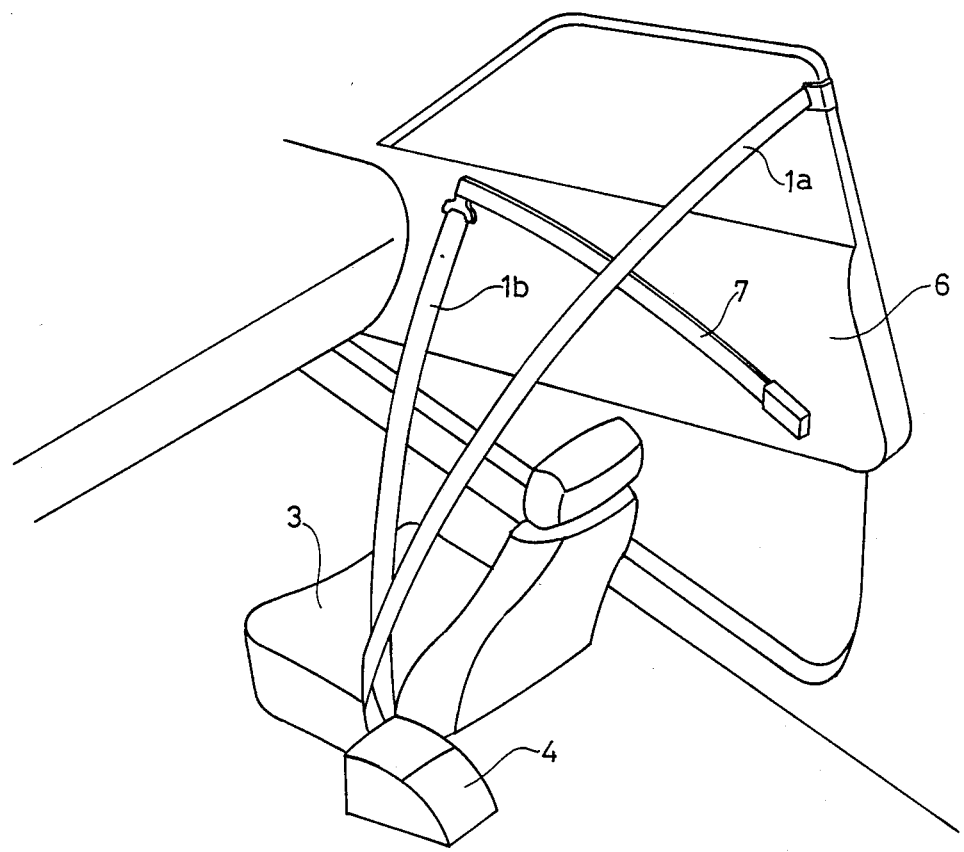
FIG. 9 is a perspective view showing an example of a three-point type seat belt.
Figure 10:
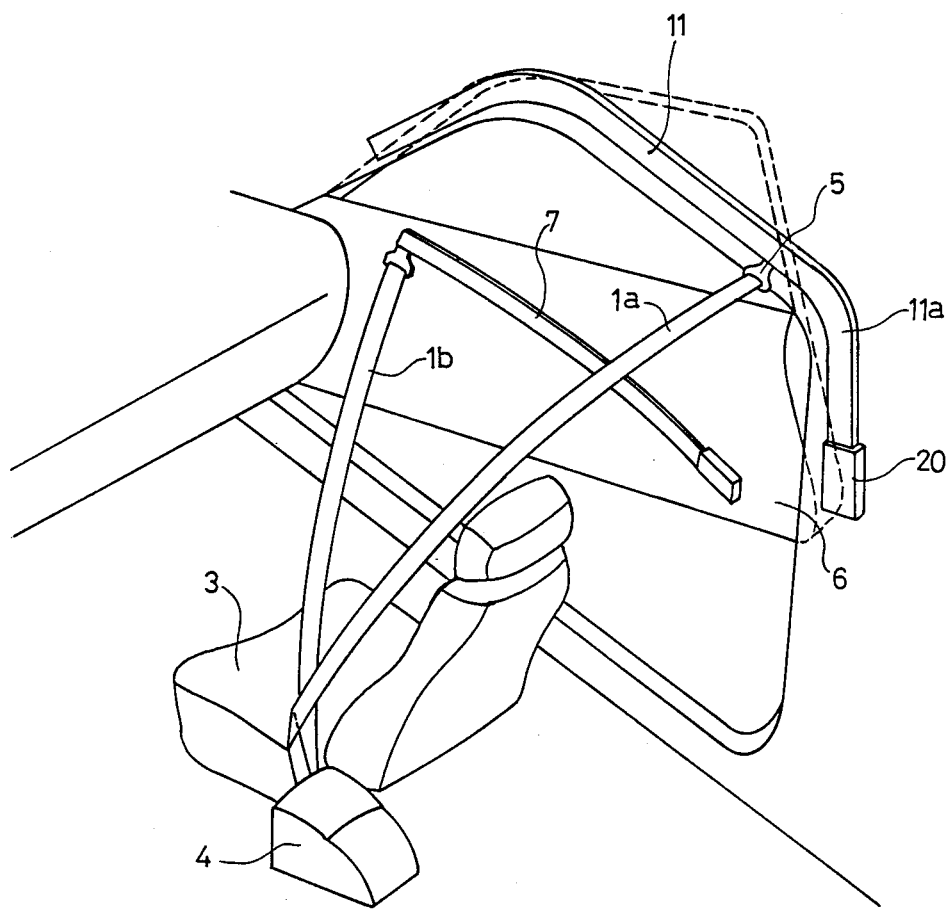
FIG. 10 is a perspective view showing another example of a three-point type seat belt.

The present invention can be practiced not only in such an automatic locking and releasing arrangement for shoulder belt as shown in FIG. 1 but also in such an automatic locking and releasing arrangement for waist belt as shown in FIGS. 9 and 10.

We claim:

1. An automatic locking and releasing arrangement for vehicular seat belt including:
    a guide rail mounted along an opening portion of a vehicular door on the inside surface of the door pivotably disposed within said opening portion;
    a cable adapted to slide through a first guide passage formed in the guide rail;
    a drive means for driving the cable;
    a connector and a cam both fixed to the cable at a predetermined spacing from each other;
    a slider fitted slidably in a second guide passage formed in the guide rail in communication with the first guide passage, and adapted to engage the connector and the cam and slide through the second guide passage of the guide rail;
    a seat belt attached to the slider;
    an anchor means for retaining the slider in a locking position of the seat belt; and
    a ring-like slide member fixed to a core of the cable portion positioned at least between said connector and said cam, said ring-like slide member comprising a plurality of slide portions arranged at slight intervals in the longitudinal direction of the cable through a flexible portion formed between adjacent said slide portions, the section of each said slide portion in a plane perpendicular to the core of the cable having a smaller diameter than the section of said first guide passage, and the cable being slid through the first guide passage of the guide rail by said slide portions of said ring-like slide member.

2. An automatic locking and releasing arrangement for vehicular seat belt according to claim 1, wherein said anchor means has a movable anchor latch normally urged to project into said guide rail; said slider is formed with a pawl for engagement with said anchor latch; said connector and cam are disposed in spaced relation to each other so that they can travel a predetermined distance with respect to the front and rear ends of said slider; and said pawl of the slider and said anchor latch engaged with and disengaged from each other by contact of the cam and the anchor latch.

3. An automatic locking and releasing arrangement for vehicular seat belt according to claim 1, wherein said anchor means has a pivotable anchor latch normally urged in a direction leaving said pawl of the slider; said connector slides between two retaining portions formed at the front and rear end portions of said slider; said cam is mounted in a position spaced a predetermined distance from said connector; and said slider pawl and said anchor latch are engaged with and disengaged from each other by contact of said cam with said anchor latch to pivot the latter.

4. An automatic locking and releasing arrangement for vehicular seat belt according to claim 1, wherein said connector and said cam fixed onto the cable are disposed in spaced relation to each other so that they can travel a predetermined distance with respect to the front and rear ends of said slider; said anchor means has a pivotable anchor latch normally urged in a direction leaving said pawl of the slider; said cam is mounted in a position spaced a predetermined distance from said connector; and said slider pawl and said anchor latch are engaged with and disengaged from each other by contact of said cam with said anchor latch to pivot the latter.

5. An automatic locking and releasing arrangement for vehicular seat belt according to claim 1, wherein said ring-like member disposed between said connector and said cam is formed integrally with the core of the cable by molding a synthetic resin.

6. An automatic locking and releasing arrangement for vehicular seat belt according to claim 1, wherein said ring-like slide member disposed between said connector and said cam includes rings.

7. An automatic locking and releasing arrangement for vehicular seat belt according to claim 1, wherein said seat belt is attached directly to the slider.

8. An automatic locking and releasing arrangement for vehicular seat belt according to claim 1, further comprising a buckle, said seat belt being attached to the slider through said buckle.

* * * * *